US006296775B1

(12) United States Patent
Moody et al.

(10) Patent No.: US 6,296,775 B1
(45) Date of Patent: Oct. 2, 2001

(54) APPARATUS AND METHOD FOR UV WASTEWATER PURIFICATION IN SEPTIC TANK SYSTEMS

(76) Inventors: Kenneth W. Moody; Janet L. Dally, both of P.O. Box 203, Puyallup, WA (US) 98371

( * ) Notice: Subject to any disclaimer, the term of this patent is extended or adjusted under 35 U.S.C. 154(b) by 0 days.

(21) Appl. No.: 09/434,375

(22) Filed: Nov. 5, 1999

Related U.S. Application Data

(60) Provisional application No. 60/107,662, filed on Nov. 9, 1998.

(51) Int. Cl.[7] .................................................. C02F 1/32
(52) U.S. Cl. ...................... 210/748; 210/95; 210/532.2; 250/436
(58) Field of Search ................................ 210/748, 198.1, 210/205, 170, 95, 259, 532.2; 250/436; 422/24, 186.3

(56) References Cited

U.S. PATENT DOCUMENTS

| | | | |
|---|---|---|---|
| 2,189,279 | * | 2/1940 | Bitner .................................. 210/748 |
| 3,859,215 | * | 1/1975 | Milne .................................. 210/170 |
| 3,971,947 | | 7/1976 | Lambert et al. ..................... 250/437 |
| 4,104,166 | | 8/1978 | LaRaus ................................ 210/256 |
| 4,250,040 | | 2/1981 | LaRaus ................................ 210/760 |
| 4,276,256 | | 6/1981 | Karamian ............................... 422/24 |
| 4,296,328 | | 10/1981 | Regan ................................. 250/436 |
| 4,700,101 | | 10/1987 | Ellner et al. ....................... 250/436 |
| 4,728,368 | | 3/1988 | Pedziwiatr ......................... 210/748 |
| 4,762,613 | | 8/1988 | Snowball ............................ 210/192 |
| 4,895,645 | * | 1/1990 | Zorich, Jr. .......................... 210/150 |
| 5,019,256 | | 5/1991 | Ifill, et al. ........................ 210/232 |
| 5,144,146 | | 9/1992 | Wekhof ................................ 422/24 |
| 5,208,461 | | 5/1993 | Tipton ................................ 250/436 |
| 5,256,299 | | 10/1993 | Wang et al. ........................ 210/664 |
| 5,290,439 | * | 3/1994 | Buchwald ......................... 210/198.1 |
| 5,320,749 | * | 6/1994 | Mullen ................................ 210/748 |
| 5,352,357 | * | 10/1994 | Perry ................................. 210/150 |
| 5,422,487 | | 6/1995 | Sauska et al. ...................... 250/436 |
| 5,540,848 | * | 7/1996 | Engelhard ........................... 210/748 |
| 5,620,602 | | 4/1997 | Stuth ................................. 210/608 |
| 5,624,573 | | 4/1997 | Wiesmann ........................... 210/748 |
| 5,632,896 | | 5/1997 | Vandervelde et al. .............. 210/617 |
| 5,707,513 | | 1/1998 | Jowett et al. ...................... 210/150 |
| 5,738,781 | | 4/1998 | Carlson .............................. 210/170 |
| 5,840,196 | * | 11/1998 | Laurent .............................. 210/748 |
| 5,942,110 | * | 8/1999 | Norris ................................ 210/748 |

FOREIGN PATENT DOCUMENTS

| 202820 | 11/1986 | (EP) . |
|---|---|---|
| WO 84/03880 | 10/1984 | (WO) . |

* cited by examiner

*Primary Examiner*—David A. Simmons
*Assistant Examiner*—Frank M. Lawrence
(74) *Attorney, Agent, or Firm*—Richard C. Litman

(57) ABSTRACT

The apparatus for UV wastewater purification in septic tank systems has an ozone free ultraviolet lamp disposed in PVC piping buried in the ground and located between the septic tank and the drainfield. The PVC piping includes a water inlet and an outlet connected by a U-shaped section of piping. The UV lamp is housed in a quartz tube, or in an alternative embodiment, in a Teflon tube, and placed in a cylindrical insert having a plurality of ports defined in the walls of the cylinder. The insert is placed in a vertically oriented leg of the U-shaped piping at the water outlet, the wastewater flowing through the insert parallel to the ultraviolet lamp. Access to the UV lamp for maintenance is provided by a vertically oriented riser pipe buried in the ground and having a length corresponding to the desired depth of the apparatus, the riser housing the electrical wiring and having a cap at ground level. The method for UV wastewater purification in septic tank systems includes the steps of selecting an ozone free UV lamp, disposing the lamp in a cylindrical insert having a plurality of ports, and placing the insert in PVC piping buried in the ground between the septic tank and the drainfield.

17 Claims, 6 Drawing Sheets

APPARATUS AND METHOD FOR UV WASTEWATER PURIFICATION IN SEPTIC TANK SYSTEMS

CROSS-REFERENCE TO RELATED APPLICATION

This application claims the benefit of U.S. Provisional Patent Application Ser. No. 60/107,662, filed Nov. 9, 1998.

BACKGROUND OF THE INVENTION

1. Field of the Invention

The present invention relates to sewerage systems and the purification of wastewater, and particularly to an apparatus and method for the elimination of bacteria and microorganisms from wastewater discharged from a septic tank system by irradiation of the wastewater with ultraviolet light.

2. Description of Related Art

Many homes in rural and outlying areas are not connected to municipal water systems and therefore rely on wells or water tanks for water supply and septic tank systems for waste disposal. The septic tank is a water tank buried in the ground for receiving waste from the plumbing system, and usually several hundred gallons of water. Solid material is usually liquified by bacterial action within twenty four hours, with sludge settling to the bottom of the tank and the effluent being discharged into a drainfield.

Groundwater contaminated by harmful bacteria and microorganisms may re-enter the food chain either directly in the water supply to homes and businesses, or through irrigation of crops, or through ingestion by animals raised for human consumption. In recent years public awareness of the deleterious effects of discharging untreated wastewater into the environment has resulted in both voluntary and government mandated efforts to treat wastewater effluent in order to remove harmful bacteria and microorganisms before discharging the water back into the environment. Municipal water systems now include wastewater treatment plants to provide a central location in which the wastewater may be germicidally treated before discharge.

A few systems for the treatment of wastewater from septic tanks have been developed. U.S. Pat. No. 5,738,781, issued Apr. 14, 1998 to T. Carlson, describes a septic tank system for recycling water having a septic tank divided into multiple chambers including a chamber containing granulated charcoal for removing odors and a chamber containing coarse and fine gravel for filtering particulate matter. U.S. Pat. No. 5,707,513, issued Jan. 13, 1998 to Jowett, et al., shows a septic tank wastewater treatment apparatus using polyurethane foam blocks as a filter medium to support aerobic biological treatment. U.S. Pat. No. 5,632,896, issued May 27, 1997 to Vandervelde, et al., teaches a filtration system using producing an ultra-thin film surface of water for more effective treatment by aerobic bacteria through a layer of fabric or sand.

U.S. Pat. No. 5,620,602, issued Apr. 15, 1997 to R. E. Stuth, discloses a device placed in a second chamber of a septic tank which froths the wastewater through a packing media having a high surface area to volume ratio to improve aerobic bacterial digestion of organic waste. U.S. Pat. Nos. 4,250,040 and 4,104,166, issued Feb. 10, 1981 and Aug. 1, 1978, respectively, to J. LaRaus, teach a method of treating septic tank wastewater by passing the waste through ozonating tanks which diffuse ozone through the water, at least one of the tanks having a charcoal filter, ozonating the wastewater being beneficial in promoting aerobic biodegradation of organic waste.

Chlorination has been used for the purification of water. However, many states and counties now forbid the discharge of chlorinated wastewater due to its adverse affects on vegetation. In any event, chlorination requires the use of tablets in the septic tank to chlorinate the water and then additional tablets to dechlorinate the water before discharge, an expensive, inconvenient process entailing the risk of chemical damage to the environment.

In the scheme of the present invention, the previously described water treatments involving filtration, aerobic digestion, ozonating and chlorinating are referred to as pretreatment methods. They are effective in liquefying wastewater, removing particulate matter, and removing between 70% and 85% of harmful microorganisms. The present invention utilizes irradiation with ultraviolet light (UV) to complete purification of the wastewater before discharge, particularly to eliminate E. coli and various forms of fecal coliform bacteria. Ultraviolet radiation offers several advantages. UV is effective against all microorganisms. It is economical, purifying hundreds of gallons per kilowatt hour. UV is safe, not requiring dangerous chemicals with the corresponding risk of overdose or danger to the environment. UV provides continuous germicidal action without special attention or measurement, and without leaving a chlorine taste in recycling systems and without corrosion problems affecting the plumbing.

It is known that irradiation of water with ultraviolet light within the range from about 150 nanometers through about 300 nanometers is effective in destroying microorganisms. The purification of fresh water by ultraviolet radiation for drinking purposes is described in U.S. Pat. No. 4,762,613, issued Aug. 9, 1988 to M. R. Snowball, for use in the laboratory in U.S. Pat. Nos. 4,276,256, issued Jun. 30, 1981 to N. A. Karamian and 4,296,328, issued Oct. 20, 1981 to M. D. Regan, and for aquarium or swimming pool use in U.S. Pat. No. 3,971,947, issued Jul. 27, 1976 to Lambert, et al. The use of racks of ultraviolet lamps in wastewater treatment plants is shown in U.S. Pat. No. 5,019,256, issued May 28, 1991 to Ifill, et al., U.S. Pat. No. 5,256,299, issued Oct. 26, 1993 to Wang, et al., U.S. Pat. No. 5,422,487, issued Jun. 6, 1995 to Sauska, et al., and U.S. Pat. No. 5,624,573, issued Apr. 29, 1997 to R. Wiesmann.

U.S. Pat. No. 4,700,101, issued Oct. 13, 1987 to Ellner, et al., teaches the construction of UV lamps which may be connected end to end or side by side. U.S. Pat. No. 4,728,368, issued Mar. 1, 1988 to E. A. Pedziwiatr, describes cleaning the quartz tubes housing ultraviolet lamps used in wastewater treatment by ultrasound. U.S. Pat. No. 5,144,146, issued Sep. 1, 1992 to A. Wekhof, teaches a method of treating waste water using pulsed UV radiation over a broad band at different power levels to cover the full range of microbial organisms. U.S. Pat. No. 5,208,461, issued May 4, 1993 to F. D. Tipton, discloses a wastewater treatment system including a stainless steel box having a lid, an inlet, an outlet, and a housing having a plurality of UV lamps disposed at an acute angle relative to effluent flow, the flow being substantially horizontal.

International Patent WO 84/03880, published Oct. 11, 1984, shows a water purification chamber which is cylindrical and oriented vertically with a UV lamp in the center of the cylinder, 5 vertical chambers arranged radially around the lamp, an inlet in the first chamber, an outlet in the fifth chamber, and communication between adjacent chambers alternating between top and bottom so that the water travels in a long path from the first chamber to the fifth chamber to ensure a sufficiently long exposure to UV radiation. European Patent No. EP 202,820, published Nov. 26, 1986, describes a water purifier with a UV lamp in a quartz tube enclosed in a jacket having inlet and outlet tubes on the side of the jacket, the jacket having helical grooves defined in its exterior causing a turbulent flow of the water to ensure all of the water comes close to the UV tube for effective germicidal action.

It is known that some western States in the continental United States are beginning to experiment with the installation of ultraviolet lamps for water purification in some septic tank systems. However, currently the lamps are being housed in concrete vaults, an expensive, time consuming, and inconvenient mode of installation. There is therefore a need for a simple, economical, easily serviceable, waterproof apparatus and method for installing an ultraviolet light water purification unit in a septic tank system.

A further known problem with ultraviolet water purification units arises from housing ultraviolet lamps in quartz tubes, which are used because quartz is essentially transparent to UV radiation at the wavelengths used in wastewater treatment, having a high transmittance and allowing the passage of UV radiation with little loss in power. However, particulate matter remaining in wastewater even after filtering and other pretreatment methods has a tendency to adhere to the quartz tube, diminishing the power of UV radiation emitted from the tube and requiring periodic cleaning and frequent maintenance. Quartz tubes are also fragile, requiring special precautions in handling and installation. It is therefore desirable to provide a housing for the ultraviolet lamp which resists contamination by particulate matter and which is more rugged and therefore able to withstand rough handling during installation and maintenance.

None of the above inventions and patents, taken either singly or in combination, is seen to describe the instant invention as claimed.

SUMMARY OF THE INVENTION

The apparatus for UV wastewater purification in septic tank systems has an ozone free ultraviolet lamp disposed in PVC piping which either may be buried in the ground, or in a pump housing if the septic tank system is so equipped, and located between the septic tank and the drainfield. The PVC piping includes a water inlet and an outlet connected by a U-shaped section of piping. The UV lamp is housed in a quartz tube, or in an alternative embodiment, in a Teflon tube, and placed in a cylindrical insert having a plurality of ports defined in the walls of the cylinder. The insert is placed in a vertically oriented leg of the U-shaped piping at the water outlet, the wastewater flowing through the insert parallel to the ultraviolet lamp. Access to the UV lamp for maintenance is provided by a vertically oriented riser pipe buried in the ground and having a length corresponding to the desired depth of the apparatus, the riser housing the electrical wiring and having a cap at ground level. The method for UV wastewater purification in septic tank systems includes the steps of selecting an ozone free UV lamp, disposing the lamp in a cylindrical insert having a plurality of ports, and placing the insert in PVC piping buried in the ground between the septic tank and the drainfield.

Accordingly, it is a principal object of the invention to provide an apparatus for the purification of wastewater in a septic tank system which utilizes irradiation of wastewater by ultraviolet light to reduce or eliminate the population of harmful bacteria and microorganisms in the water.

It is another object of the invention to provide an apparatus and method for wastewater purification in septic tank systems which is economical and which may be buried in the ground or installed in a pump housing and has an ultraviolet light disposed in a system of PVC piping between the septic tank and the drainfield.

It is a further object of the invention to provide an underground wastewater purification apparatus using irradiation of the wastewater by ultraviolet light which may be conveniently accessed for maintenance and service of the UV lamp through a cap in a vertically oriented riser tube located above the water outlet.

Still another object of the invention is to provide a rugged housing for an ultraviolet lamp used in a wastewater purification system which resists contamination by particulate matter in the wastewater by making the housing from Teflon.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is an apparatus, designated generally as 10 in FIGS. 1 through 6, for ultraviolet wastewater purification in septic tank systems. As shown in FIG. 1A, the apparatus 10 is placed between the septic tank A and the drainfield (not shown). Formerly, most septic tank systems were entirely gravity fed, the wastewater flowing to the drainfield entirely by gravity. Currently septic tank systems are frequently installed with a pump tank B reservoir, as shown in FIG. 1A, from which the wastewater is fed to the drainfield by a pump.

Figure 1A:
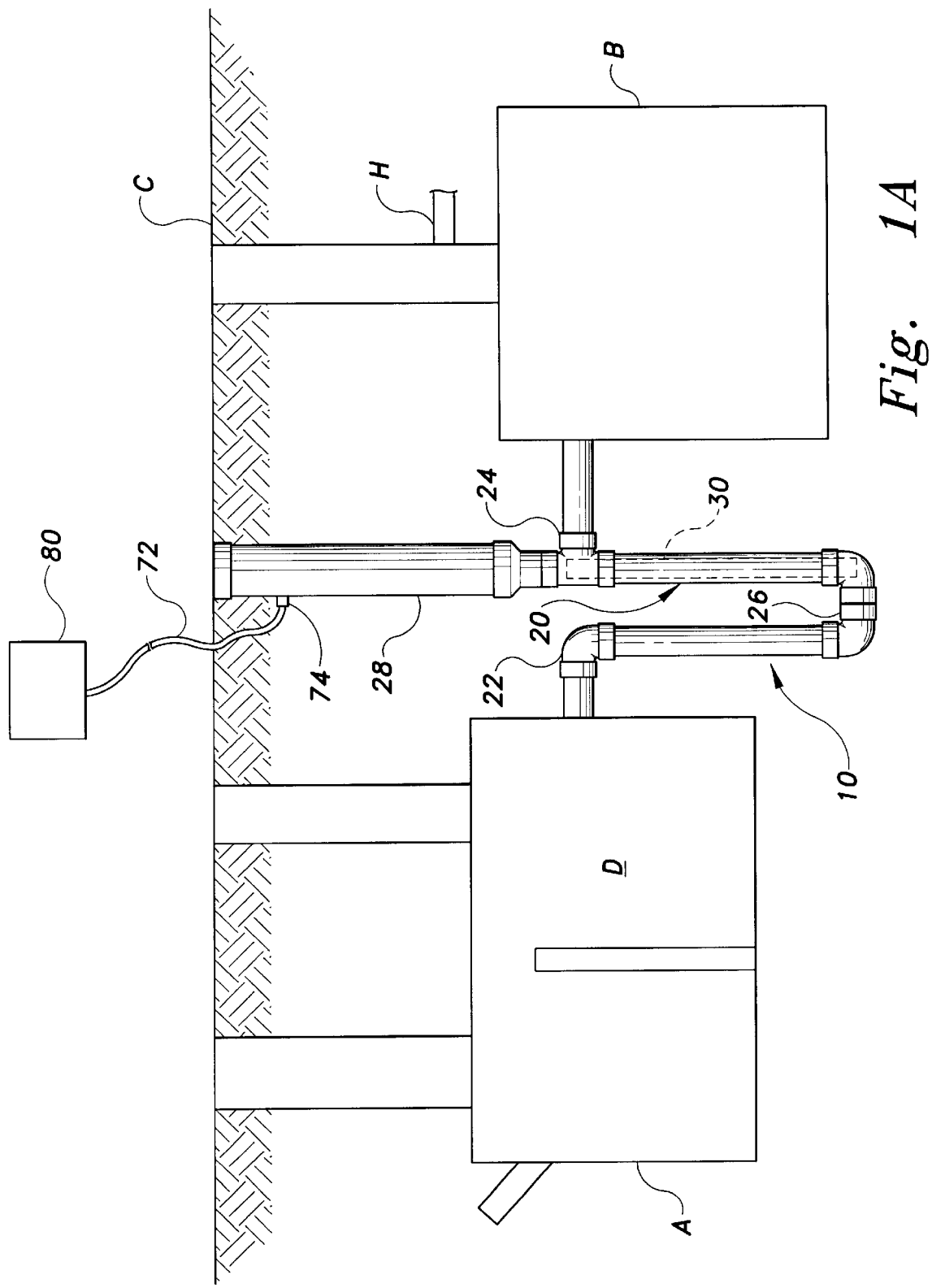
FIG. 1A is a below-ground elevational view of an apparatus for UV wastewater purification in septic tank systems according to the present invention.

The apparatus 10 may be used in conjunction with a pretreatment system, such as a filter system or an aerobic biological system which may remove particulate organic matter and about seventy to eighty-five percent of harmful bacteria and microorganisms. Such pretreatment systems are often housed in a second chamber D in the septic tank A, as shown in FIG. 1A. Of course, the apparatus 10 may also be used as a stand-alone treatment system, ultraviolet radiation being an effective germicidal agent against a broad range of microorganisms.

As shown in FIG. 1, the apparatus 10 includes a system of PVC piping 20 buried in the ground C, including a water inlet tube 22, an outlet tube 24, a U-shaped section 26 between the inlet 22 and outlet 24, a riser pipe 28 between the outlet 24 and the surface of the ground C, and an insert 30 containing an ultraviolet light source disposed in a vertical leg of the U-shaped section 26 at the outlet 24.

Figure 1B:
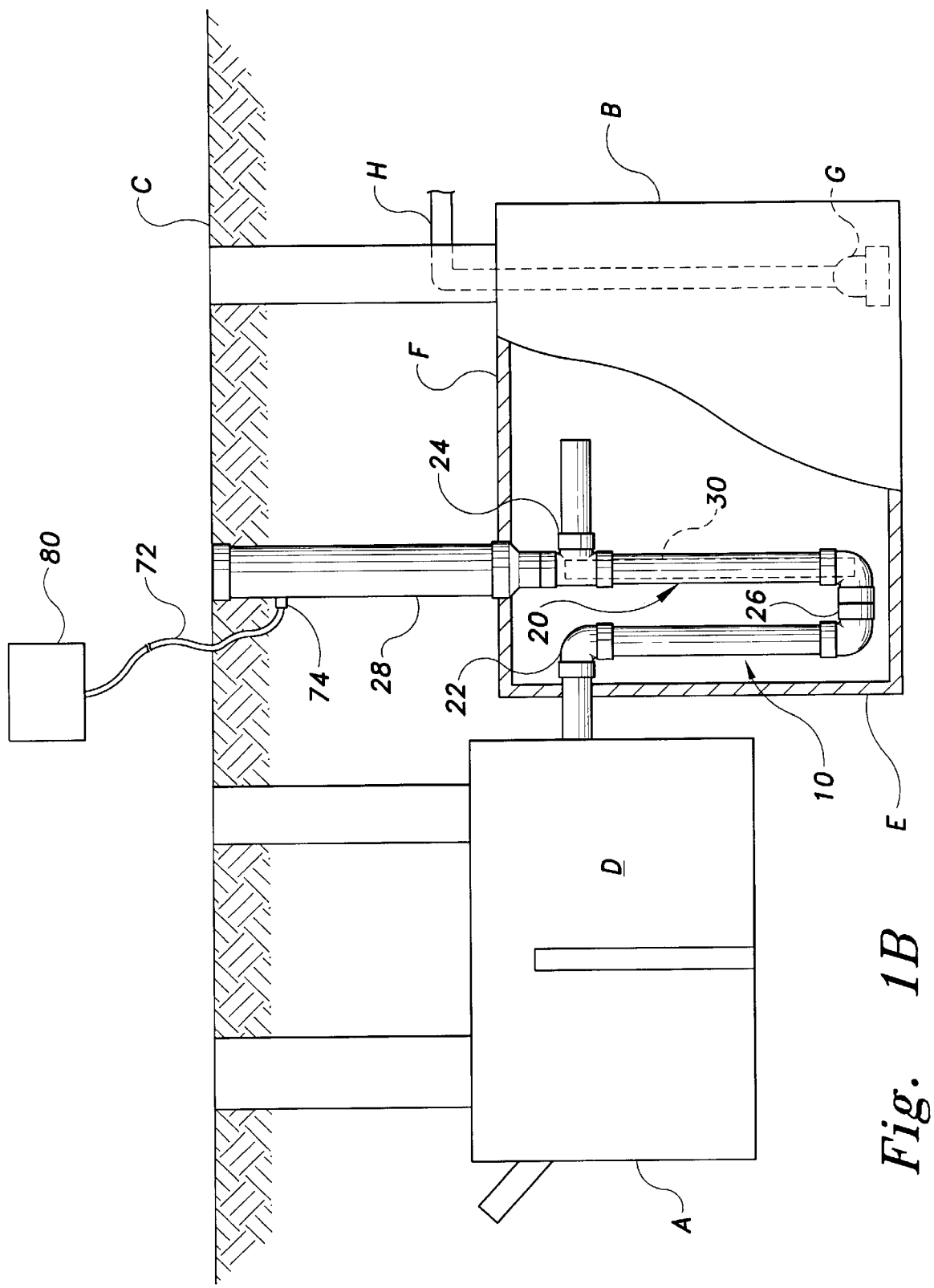
FIG. 1B is a below-ground elevational view of an alternative installation of the apparatus for UV wastewater purification in septic tank systems according to the present invention.

FIG. 1B shows an alternative installation of the apparatus 10 which may be used in septic tank systems which are equipped with a pump tank reservoir B. Instead of burying the PVC piping 20 in the ground, the system of PVC piping 20 is disposed within the reservoir B. The water inlet tube 22 is connected to appropriate tubing from the septic tank A entering the wall E of the reservoir B housing, and the riser pipe 28 exits the pump tank reservoir B through an appropriate opening defined in the top F of the pump tank reservoir B, waterproofing the joints by caulking or by appropriate seals. The effluent is discharged through the outlet tube 24 of the apparatus 10 directly into the pump tank reservoir B. From there the pump G (shown schematically in FIG. 1B) discharges the effluent through appropriate piping H to the drainfield (not shown). Disposing the apparatus within the pump tank reservoir B has the advantage of ease of installation.

Figure 2:
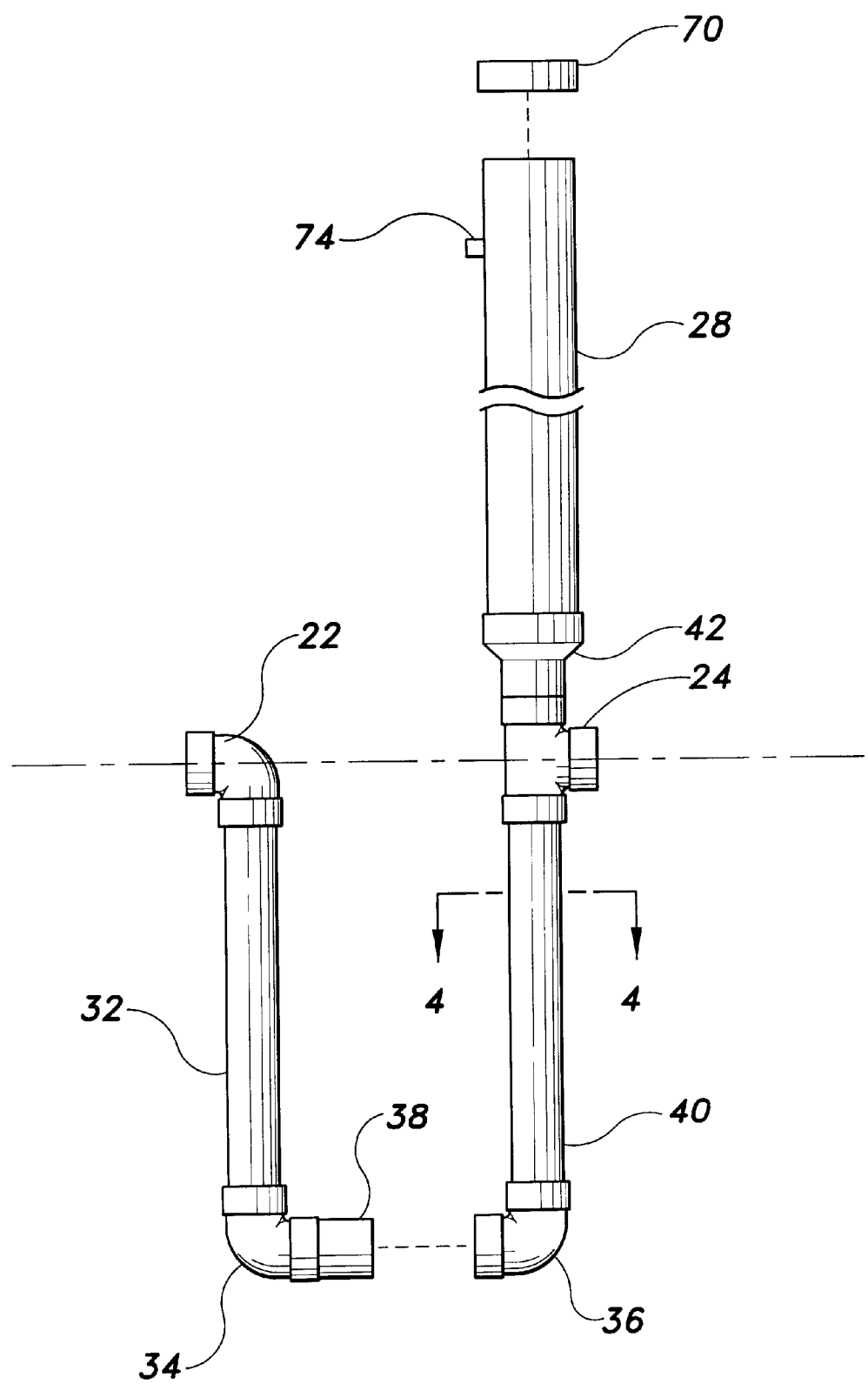
FIG. 2 is a front view of an apparatus for UV wastewater purification in septic tank systems according to the present invention.

The system of PVC piping 20 is shown more particularly in FIG. 2. Numerical specifications as recited herein by way of example and are described for enabling purposes only, and not by way of limitation. The dimensions of the piping may vary according to the plumbing of the particular septic tank system and the particular ultraviolet lamp selected as set forth below. The water inlet 22 is a polyvinyl chloride (PVC) 90° elbow, typically 4" in diameter. The outlet tube 24 is the side tube of a PVC Tee connector, also typically 4" in diameter. The U-shaped section 26 is constructed from a leg 32 of 4" diameter PVC pipe, typically about eighteen inches in length, vertically descending from the inlet 22, and joined to a 4" diameter 90° elbow 34, which is joined to a second 4" diameter 90° elbow 36 by a short length of PVC pipe 38 having an outer diameter slightly smaller that the inside diameter of the elbows 34 and 36. The U-shaped section 26 is completed by a vertically ascending 4" diameter PVC pipe 40 which is joined to an end of the outlet 24 Tee connector. The U-shaped section 26 is adjusted so that the center line of the outlet tube 24 is at or below the center line of the inlet tube 22, as shown in FIG. 2.

The other end of the outlet Tee connector 24 is connected by means of a PVC reducer 42 to a 6" diameter PVC riser 28 extending between the outlet 24 and the surface of the ground C. The length of the riser 28 is limited only by the length of the power cord of the ultraviolet lamp, as described below. In the preferred embodiment, the length of the riser 28 is adjusted so that the distance between the outlet tube 24 and the surface of the ground C is about fifty-four inches. The riser 28 is topped by a PVC cap 70 which prevents surface water from entering the riser 28. All of. the joints between the sections of PVC pipe are formed with PVC cement, preventing leaching of the wastewater to the surrounding ground C on the one hand, and protecting the insert 30 and ultraviolet lamp from the corrosive effects of any acids or minerals in the earth on the other hand. Hence, the need for a concrete vault to house the UV lamp is obviated.

Figure 3:
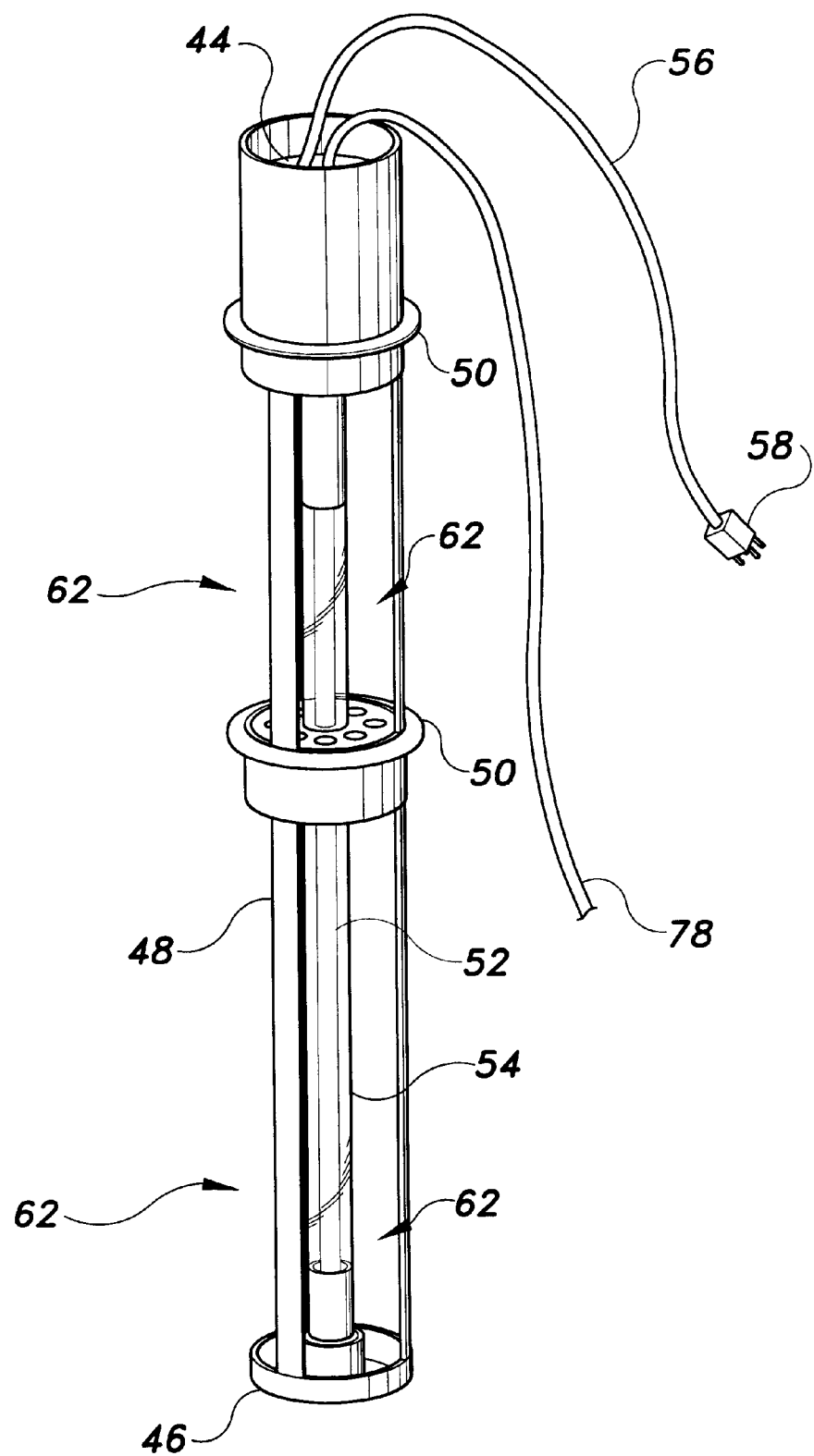
FIG. 3 is a front perspective view of an insert for the apparatus for UV wastewater purification in septic tank systems according to the present invention.

The insert 30 is shown in more detail in FIG. 3. In a first embodiment of the apparatus 10, the insert 30 is a cylinder constructed from 3" diameter PVC pipe, having a top wall 44, a base wall 46, and a side wall or skirt 48. The insert may have a plurality of O-rings 50, a boot seal, or other sealing means about its circumference to ensure a snug fit against the inside walls of the ascending leg 40 of the U-shaped section 26.

An ultraviolet lamp 52 is placed in the insert 30 aligned vertically along an axis concentric with the center of the top wall 44 and base wall 46. In the preferred embodiment, the lamp 52 may be operated from either a 110 volt power supply or a twelve volt power supply. The lamp 52 is preferably at least two feet in length. The lamp 52 emits ultraviolet light at a wavelength known to have effective bactericidal effect, preferably within the range from 150 to 300 nanometers. In a particularly preferred embodiment, the lamp 52 is about 31 7/32" in length, has a power rating of about 37 watts and 425 milliamperes, and a radiant intensity of about 112 milliwatts at a distance of one meter from the lamp 52. The lamp 52 may have a long power cord to permit the apparatus 10 to be buried at a relatively large depth. The lamp 52 preferably is ozone free, as ozone has a tendency to cause deterioration of the electrical insulation on the power cord. An example of an ultraviolet lamp 52 found acceptable for use in the apparatus of the current invention is a Ster-L-Ray, manufactured by Atlantic Ultraviolet Corporation of Bay Shore, N.Y. (model #GPH620T5L/4).

In a first embodiment, the lamp 52 is housed in a quartz tube 54 to protect the lamp from the effluent. Quartz is used because it is relatively transparent to ultraviolet radiation at wavelengths less than 350 nm, and consequently the radiation does not lose much power in passing through the quartz tube 54. The quartz tube is held in place in the insert 30 by an O-ring (not shown). In the preferred embodiment, the power cord 56 extends through the top wall 44 of the insert 30 into the riser 28 and terminates in a four pin connector 58. The connector 58 may then be attached to a direct burial cable 72 which exits the riser 28 through waterproof gasket 74 and leads to an above ground ballast and junction box 80 where household current may be transformed to an appropriate voltage for powering the lamp 52. The direct burial cable may be up to forty feet in length and rated at 600 volts.

Figure 4:
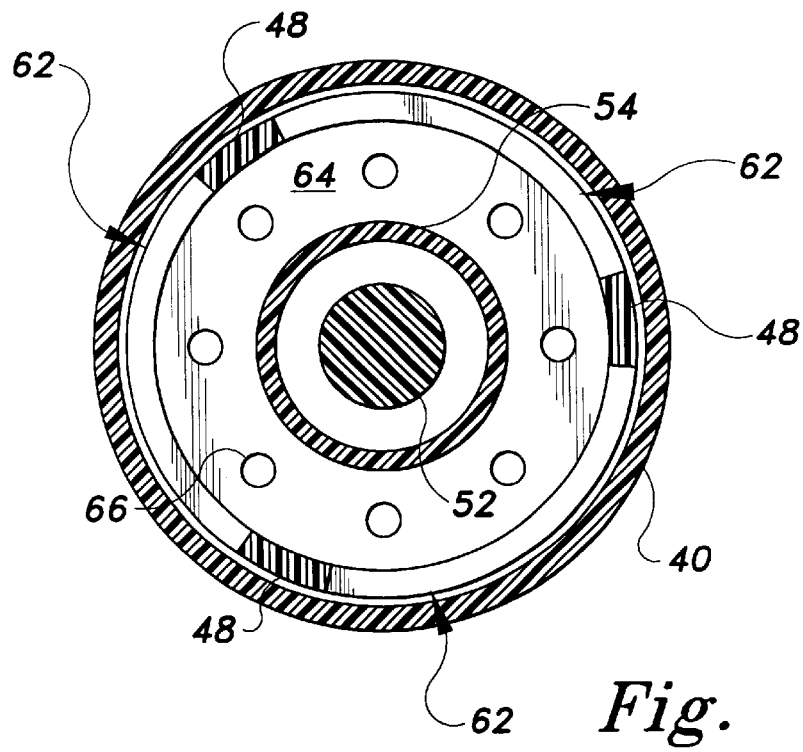
FIG. 4 is a section view along the line 4—4 of FIG. 2.

The insert 30 has a plurality of ports 62 about its circumference. Preferably, the insert 30 includes three ports 30 in the top half of the insert 30 and three ports in the bottom half of the insert 30, bisected by an annular section of the skirt 48. The ports 30 in the bottom half of the insert 30 extend to the bottom wall 46 in order to allow effluent to flow into the insert 30 and the ports 30 at the top half of the insert 30 extend to the top wall 44 of the insert 30 to allow outflow of the effluent from the insert 30, the wastewater flowing through the insert 30 parallel to the ultraviolet lamp 52. A flow restrictor 64 is disposed about the quartz tube 54 at about the longitudinal center of the insert 30. As seen in FIG. 4, the flow restrictor is an annular disk with a plurality of orifices 66 defined therein. The flow restrictor 64 is designed to slow down sudden surges in the flow of effluent which may be occasioned when clothes washers and the like are emptied, in order to allow sufficient time for irradiation of the effluent by the ultraviolet lamp 52 through the quartz tube 54.

Figure 5:
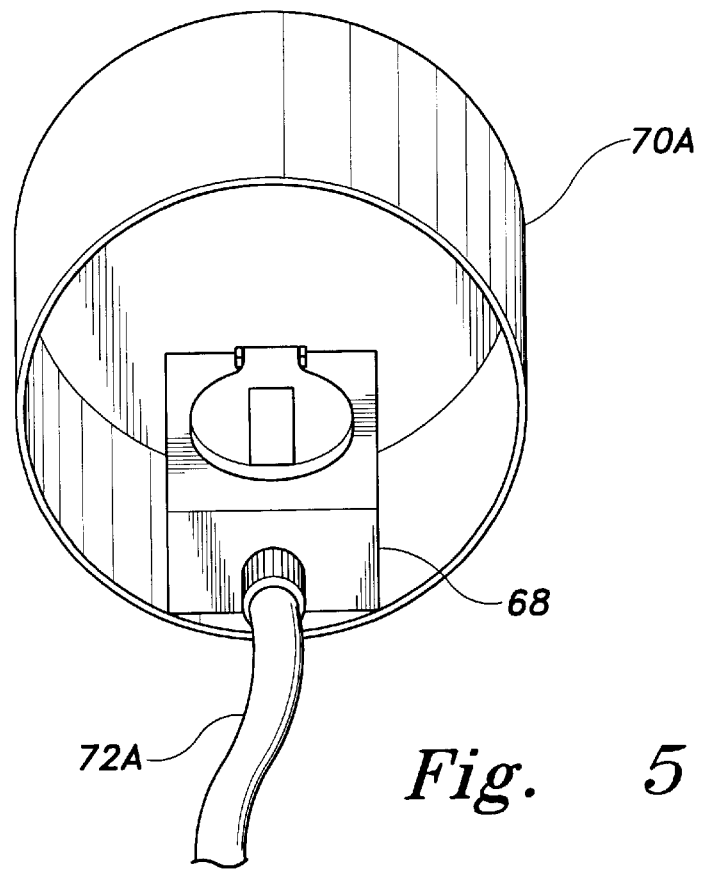
FIG. 5 is a bottom perspective view of an alternative embodiment of a cap for the top of the apparatus for UV wastewater purification in septic tank systems according to the present invention.
Figure 6:
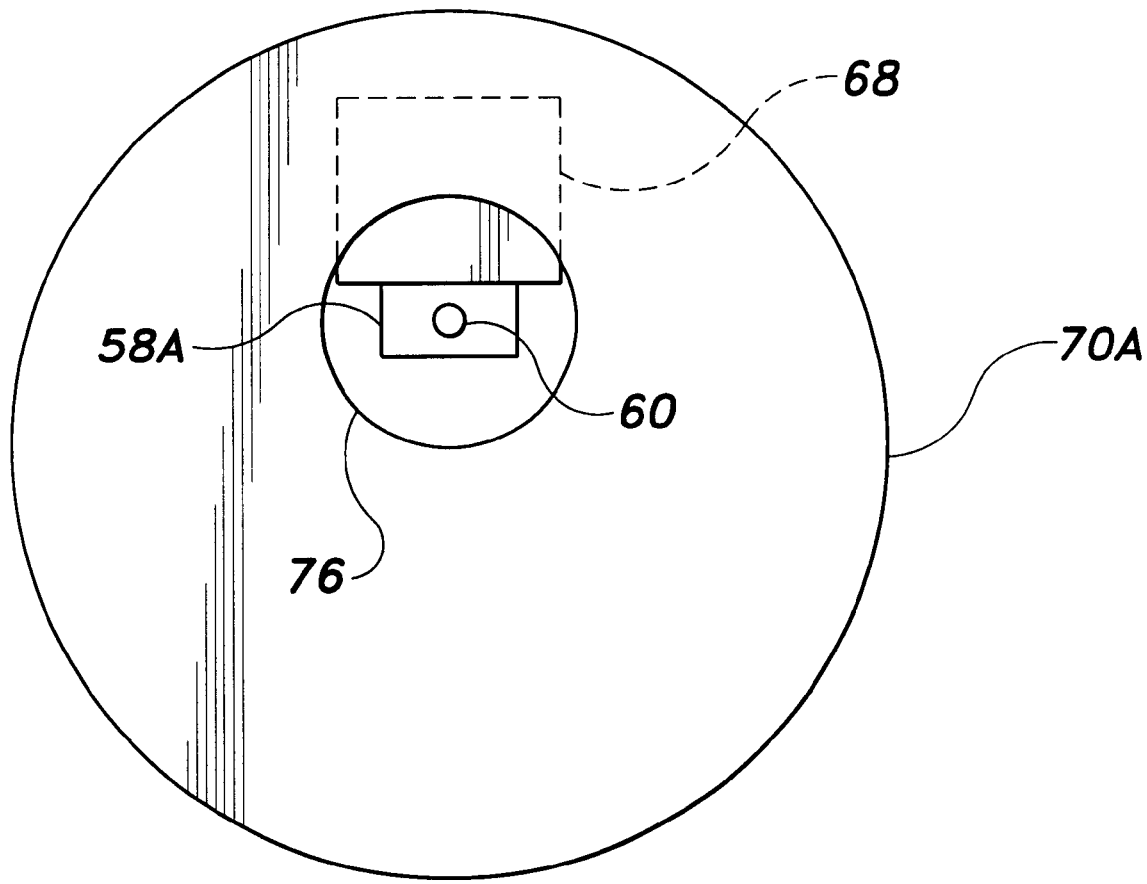
FIG. 6 is a top view of the cap shown in FIG. 5 for the top of the apparatus for UV wastewater purification in septic tank systems according to the present invention.

In an alternative embodiment shown in FIGS. 5 and 6, the power cord 56 may be about 48" in length, and exits the insert 30 through a waterproof gasket in the top wall 44 of the insert 30. In this embodiment, the power cord 56 terminates in a step-down transformer plug 58A, as shown in FIG. 6, which allows the lamp 52 to be operated from a 110 volt system. The transformer plug 58A includes an LED indicator 60 which emits visible light when the plug 58A is connected to a power source. The power cord 56 for the ultraviolet lamp 52 extends through the riser 28 and the plug 58A is inserted into a waterproof receptacle 68 installed in a watertight electrical box fixedly attached to the bottom surface of a cap 70A, which is used to cap the riser 28 in order to prevent surface water from entering the apparatus 10. The receptacle 68 is attached to a power source from the residence by appropriate wiring 72A entering the riser 28 through a waterproof gasket 74 in the side of the riser 28. The cap 70A is a standard 6" PVC cap with a viewing port 76 of plexiglass or other waterproof, transparent material through which the LED 60 on the UV lamp plug 58A is visible. The lamp 52 may alternatively be powered by a 12 volt power source. The apparatus includes a cord 78 attached at one end to the top wall of the insert 30 which may be temporarily secured at the other end to a hook or other means on the bottom surface of the cap 70A. The cord 78 is used to raise and lower the insert in the U-shaped section 26 during installation and for maintenance purposes.

In an alternative embodiment, the quartz tube 54 may be replaced by a transparent or translucent Teflon tube. The use of Teflon has significant advantages. One problem with quartz tubes is that even minute particulate matter in the effluent tends to adhere to the quartz, clouding up the tube and reducing the power of the UV radiation reaching the effluent, and requiring cleaning about every six months. The particulate matter does not adhere to Teflon. Secondly, by using Teflon the insert 30 may be injection molded in one operation, rather than cutting ports in PVC tubing. Third, the insert 30 may be made disposable. PVC tubing tends to be discolored after exposure to UV radiation, although the material does not degrade or decompose. With a Teflon tube substituted for the quartz tube 54, the entire insert 30 may be disposed of instead of requiring maintenance time to clean the quartz tube. Finally, unlike the quartz tube, Teflon is not fragile. Of course, for high quality work, as in UV spectrophotometry, quartz is desirable because it is relatively transparent at ultraviolet wavelengths. However, in this application, translucent Teflon permits adequate transmittance of ultraviolet light for effective germicidal action.

A method for UV wastewater purification in septic tank systems would comprise the steps of: (1) selecting an ultraviolet lamp providing ozone free radiation at a wavelength having bactericidal effect; (2) constructing a system of PVC piping with waterproof joints having an inlet joined to an outlet by a U-shaped section and a riser pipe connected to the outlet fitting; (3) disposing the system of PVC piping underground with the inlet connected to the septic tank end of the system and the outlet tube connected to the drainfield end of the system; (4) placing the ultraviolet lamp into a protective tube in an insert having a plurality of ports for the flow of effluent parallel to the ultraviolet lamp; (5) lowering the insert through the riser pipe into a leg of the U-shaped section; (6) cutting the riser pipe so that the top of the riser is level with the surface of the ground; (7) connecting the ultraviolet lamp to a source of electrical power; and (8) covering the riser pipe with a cap. Depending upon whether the apparatus is installed directly in the ground or in a pump tank reservoir, the step of disposing the system of PVC pipe underground may comprise either burying the system of PVC pipe directly in the ground, or disposing the system of PVC pipe in a pump tank reservoir. Further, depending upon whether the ballast transformer is above ground or below ground, the step of connecting the ultraviolet lamp to a source of electrical power may comprise connecting the lamp to an above ground ballast and junction box, or it may comprise the steps of installing a weatherproof receptacle in a weather tight electrical box fixedly attached to the bottom surface of a cap adapted for waterproof covering of the riser, connecting an electrical power source to the water tight electrical box, and plugging the ultraviolet light into the receptacle.

It is to be understood that the present invention is not limited to the sole embodiments described above, but encompasses any and all embodiments within the scope of the following claims. For example, it will be obvious to increase the power of the ultraviolet radiation or the duration of exposure to the ultraviolet light by placing a pair of ultraviolet lamps either side by side or end to end as is conventionally known in the art.

We claim:

1. An apparatus for UV wastewater purification in a septic tank system having a septic tank and a drainfield, the apparatus being adapted for placement underground between a septic tank end of the septic tank system and a drainfield end of the septic tank system, the apparatus comprising:
    a) a system of polyvinyl chloride piping including a vertically ascending pipe, and a vertically oriented riser pipe accessible from above the ground, said system forming a continuous fluid conduit, the wastewater flowing through said system of piping between the septic tank and the drainfield;
    b) an ultraviolet lamp emitting ozone free ultraviolet radiation in a wavelength range having a bactericidal effect, the lamp including a power cord adapted for connection to a power supply, the ultraviolet lamp being disposed within said system of PVC piping;
    c) a cap attached to said riser pipe for providing a waterproof cover for the riser pipe; and
    d) an insert, said ultraviolet lamp being housed in the insert, the insert having a plurality of ports for the ingress and outflow of wastewater, the insert being disposed in the vertically ascending pipe of said system of piping.

2. The apparatus for wastewater purification according to claim 1, further comprising a protective tube, said ultraviolet lamp being placed in the protective tube, the protective tube being adapted for protecting said ultraviolet lamp from contamination by wastewater.

3. The apparatus for wastewater purification according to claim 2, wherein said protective tube is made from quartz crystal.

4. The apparatus for wastewater purification according to claim 2, wherein said protective tube is made from transparent Teflon.

5. The apparatus for wastewater purification according to claim 2, wherein said insert further comprises a flow restrictor disposed about said protective tube at about the center of the longitudinal axis of said insert, said flow restrictor being an annular disk having a plurality of orifices defined therein.

6. The apparatus for wastewater purification according to claim 1, wherein said system of polyvinyl chloride piping comprises:
    a) an inlet tube adapted for connection to the septic tank end of the septic tank system;
    b) an outlet tube adapted for connection to the drainfield end of the septic tank system;
    c) a U-shaped section disposed between said inlet tube and said outlet tube, including the vertically ascending pipe being positioned below the outlet tube; and
    d) wherein the riser pipe is disposed between said outlet tube and the ground, an end of the riser tube being level with the surface of the ground.

7. The apparatus for wastewater purification according to claim 1, wherein said ultraviolet lamp further includes a transformer plug having an LED indicator for indicating when power is applied to said ultraviolet light, and wherein said cap includes a waterproof viewing port for observing the LED indicator from above ground with said cap in place on the riser pipe.

8. The apparatus for wastewater purification according to claim 1, wherein said ultraviolet lamp emits radiation having a wavelength between about 150 to 300 nanometers.

9. A method for UV wastewater purification in a septic tank system having a septic tank and a drainfield comprising the steps of:
   (a) selecting an ultraviolet lamp providing ozone free radiation at a wavelength having bactericidal effect;
   (b) constructing a system of PVC piping with waterproof joints having an inlet joined to an outlet by a U-shaped section and a riser pipe connected to the outlet fitting;
   (c) disposing the system of PVC piping underground with the inlet connected to the septic tank end of the system and the outlet connected to the drainfield end of the system;
   (d) placing the ultraviolet lamp into a protective tube in an insert having a plurality of ports for the flow of effluent parallel to the ultraviolet lamp;
   (e) lowering the insert through the riser pipe into a leg of the U-shaped section;
   (f) cutting the riser pipe so that the top of the riser is level with the surface of the ground;
   (g) connecting the ultraviolet lamp to a source of electrical power; and
   (h) covering the riser pipe with a cap.

10. The method for UV wastewater purification according to claim 9, wherein the step of disposing the system of PVC pipe underground further comprises burying the system of PVC pipe directly in the ground.

11. The method for UV wastewater purification according to claim 9, wherein the step of disposing the system of PVC pipe underground further comprises disposing the system of PVC pipe in a pump tank reservoir.

12. The method for UV wastewater purification according to claim 9, wherein the step of connecting the ultraviolet lamp to a source of electrical power further comprises connecting the lamp to an above ground ballast and junction box.

13. The method for UV wastewater purification according to claim 9, wherein the step of connecting the ultraviolet lamp to a source of electrical power further comprises:
   (a) installing a weatherproof receptacle in a weather tight electrical box fixedly attached to the bottom surface of a cap adapted for waterproof covering of the riser;
   (b) connecting a power source to the water tight electrical box;
   (c) plugging the ultraviolet light into the receptacle; and
   (d) thereafter performing said step of covering the riser pipe with the cap.

14. An apparatus for UV wastewater purification in a septic tank system having a septic tank and a drainfield, the apparatus being adapted for burial in the ground between a septic tank end of the septic tank system and a drainfield end of the septic tank system, the apparatus comprising:
   a) a system of polyvinyl chloride piping including a vertically ascending pipe and a vertically oriented riser pipe accessible from above the ground, the wastewater flowing through said system of piping between the septic tank and the drainfield;
   b) an ultraviolet lamp emitting ozone free ultraviolet radiation in a wavelength range having a bactericidal effect, the lamp including a power cord adapted for connection to a power supply;
   c) a protective tube, said ultraviolet lamp being placed in the protective tube, the protective tube being adapted for protecting said ultraviolet lamp from contamination by wastewater;
   d) an insert for housing said ultraviolet lamp and said protective tube, the insert having a plurality of ports for the ingress and outflow of wastewater, the insert being disposed in the vertically ascending pipe of said system of piping; and
   e) a cap for providing a waterproof cover for the riser pipe, the cap including an electrical receptacle adapted for connection to a power supply.

15. The apparatus for wastewater purification according to claim 14, wherein said protective tube is made from quartz crystal.

16. The apparatus for wastewater purification according to claim 14, wherein said protective tube is made from transparent Teflon.

17. The apparatus for wastewater purification according to claim 14, wherein said system of polyvinyl chloride piping comprises:
   a) an inlet tube adapted for connection to the septic tank end of the septic tank system;
   b) an outlet tube adapted for connection to the drainfield end of the septic tank system;
   c) a U-shaped section disposed between said inlet tube and said outlet tube, including the vertically ascending pipe being positioned below the outlet tube; and
   d) wherein the riser pipe is adapted to be disposed between said outlet tube and the ground, an end of the riser tube being level with the surface of the ground.

* * * * *